Jan. 10, 1928.  1,655,510
A. L. RUNYAN
MECHANISM FOR SELECTIVELY REPRODUCING CHARACTERS AND SOUNDS
Filed Feb. 19, 1926   8 Sheets-Sheet 1
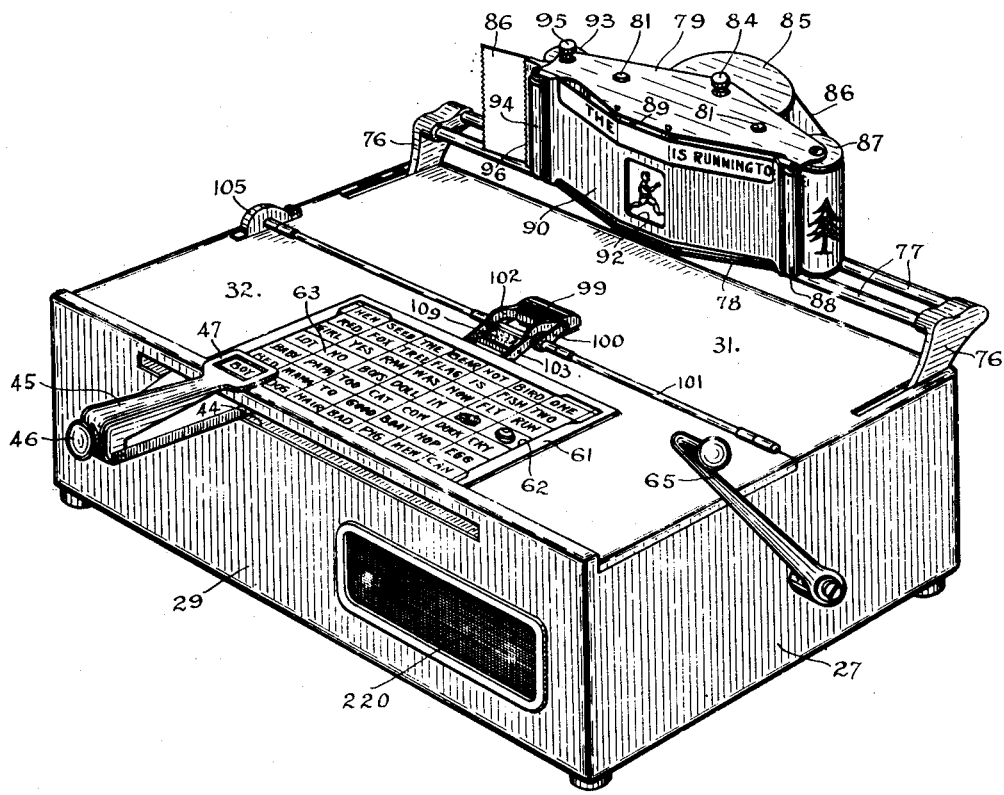
Fig-1-
Inventor:
ARTHUR L. RUNYAN.
By David O. Barnell,
Attorney.
Witness:
R. J. Honomichl.

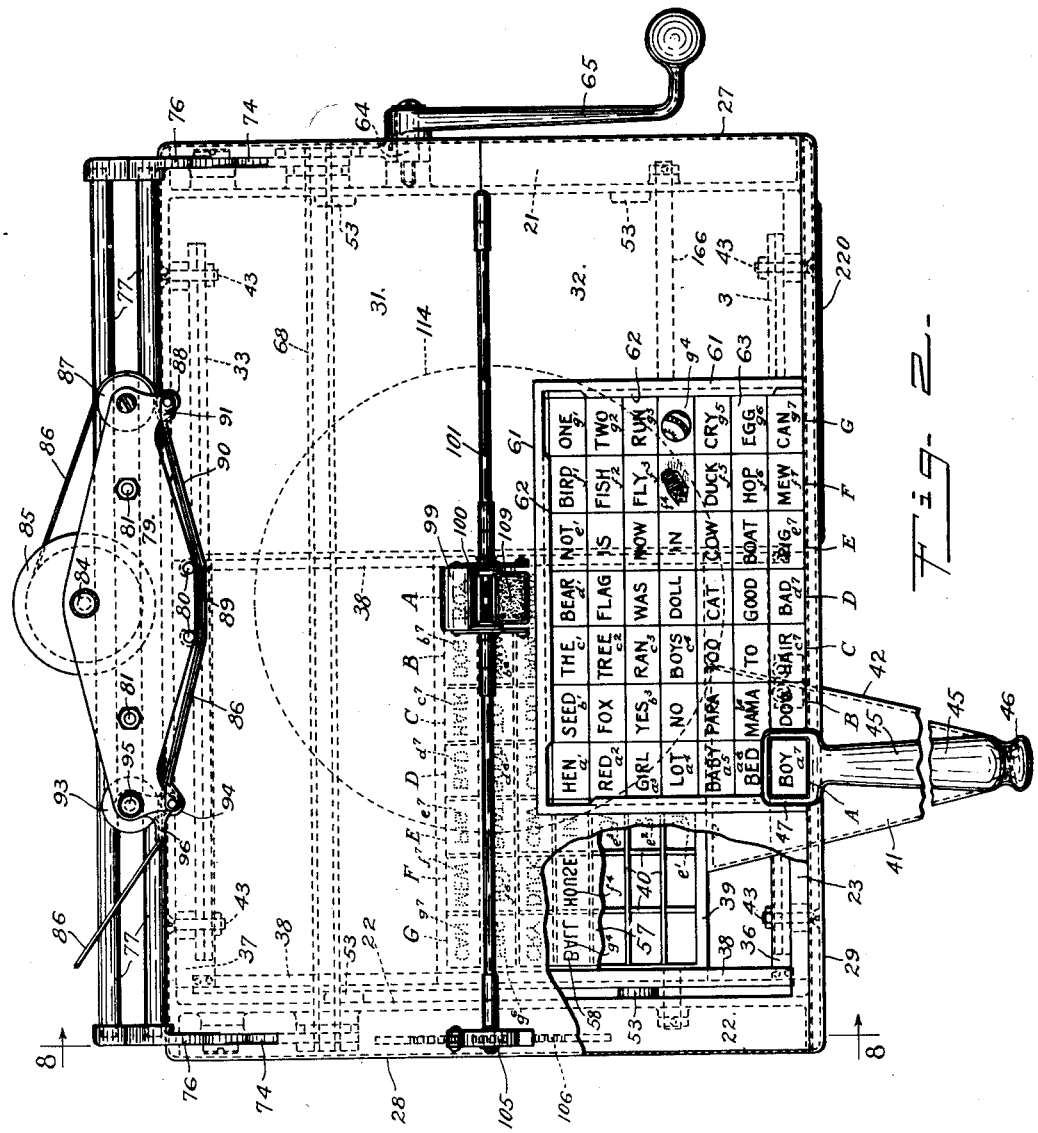

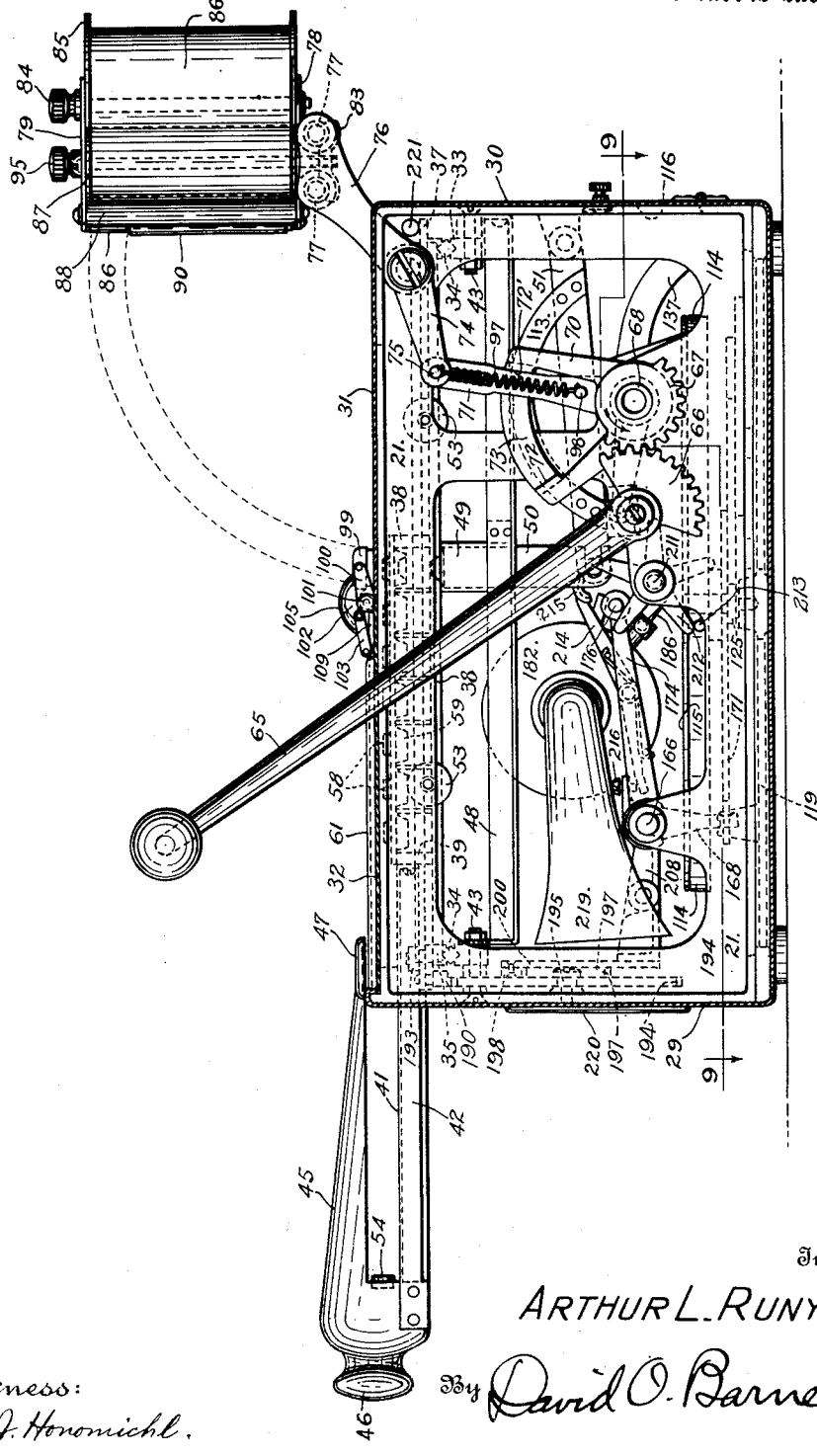

Jan. 10, 1928.
A. L. RUNYAN
1,655,510
MECHANISM FOR SELECTIVELY REPRODUCING CHARACTERS AND SOUNDS
Filed Feb. 19, 1926
8 Sheets-Sheet 4
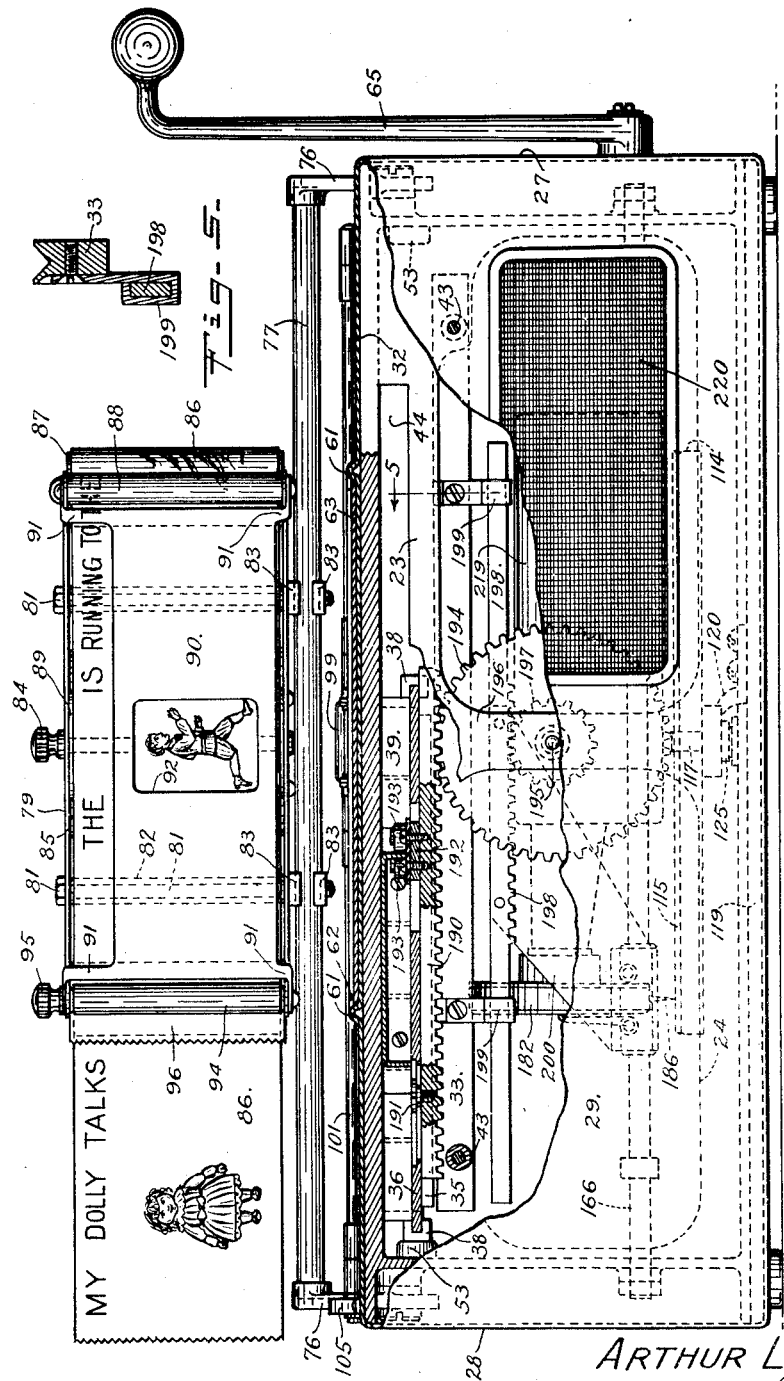
Witness:
R. J. Honomichl.
Inventor:
ARTHUR L. RUNYAN.
By David O. Barnell
Attorney.

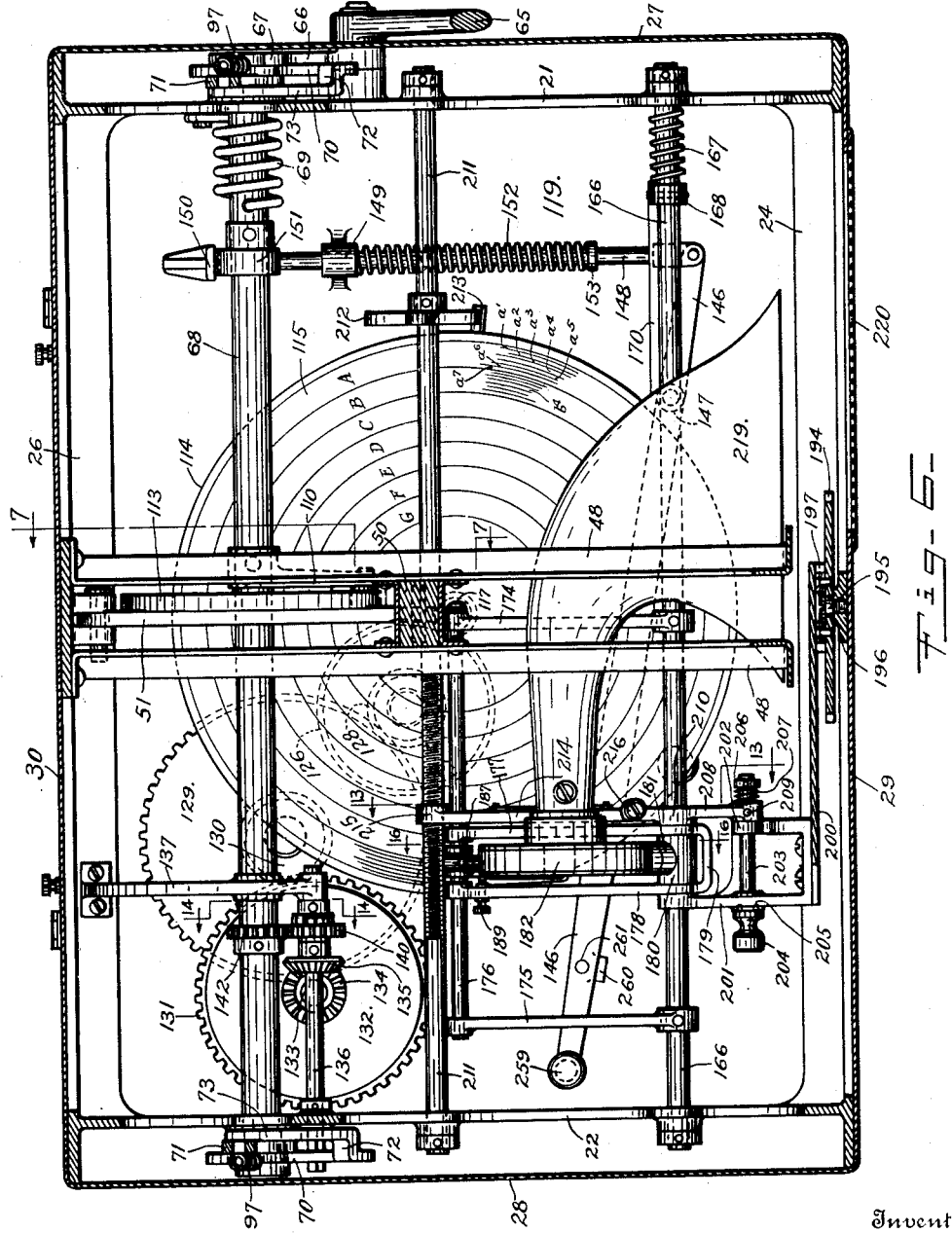

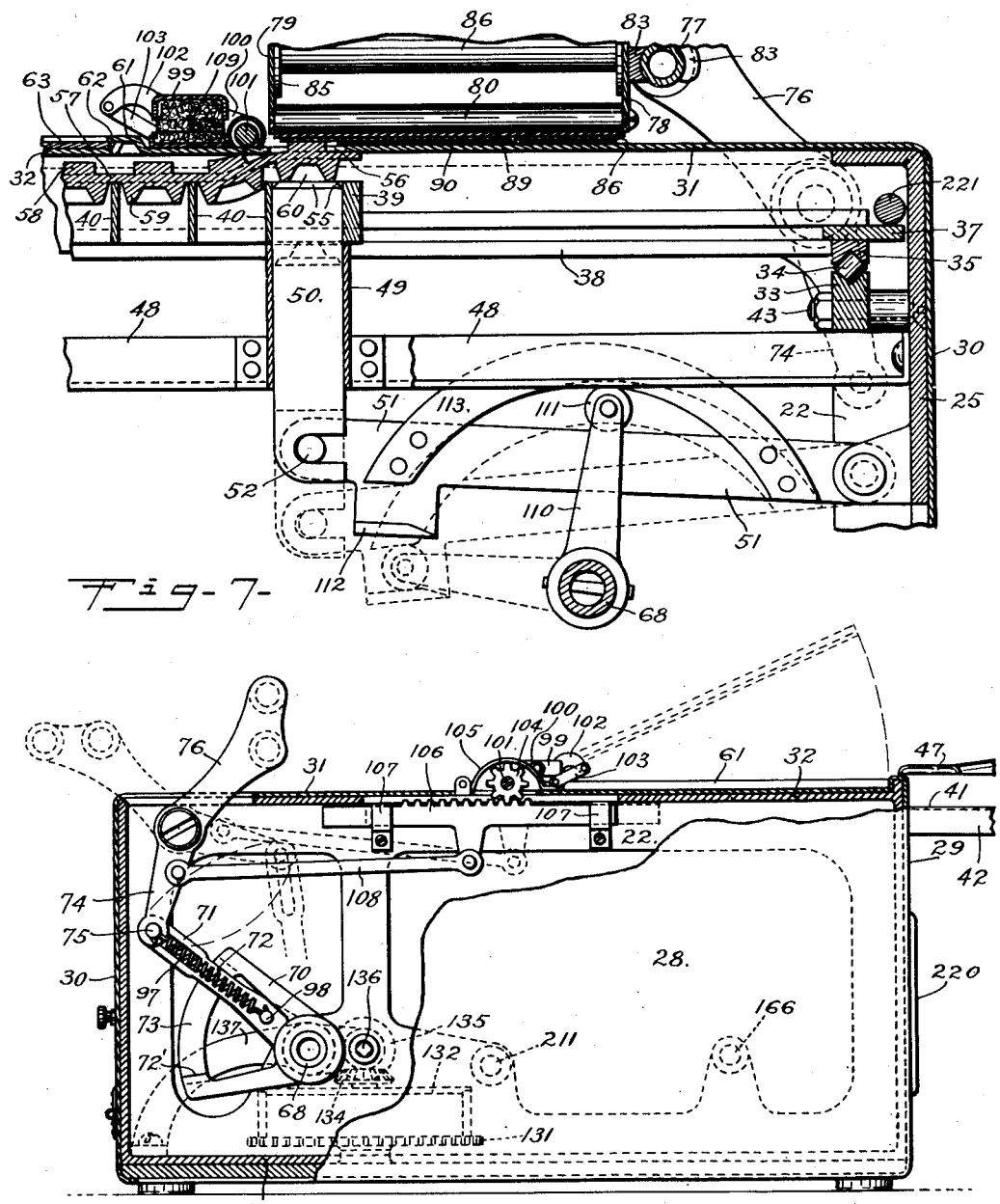

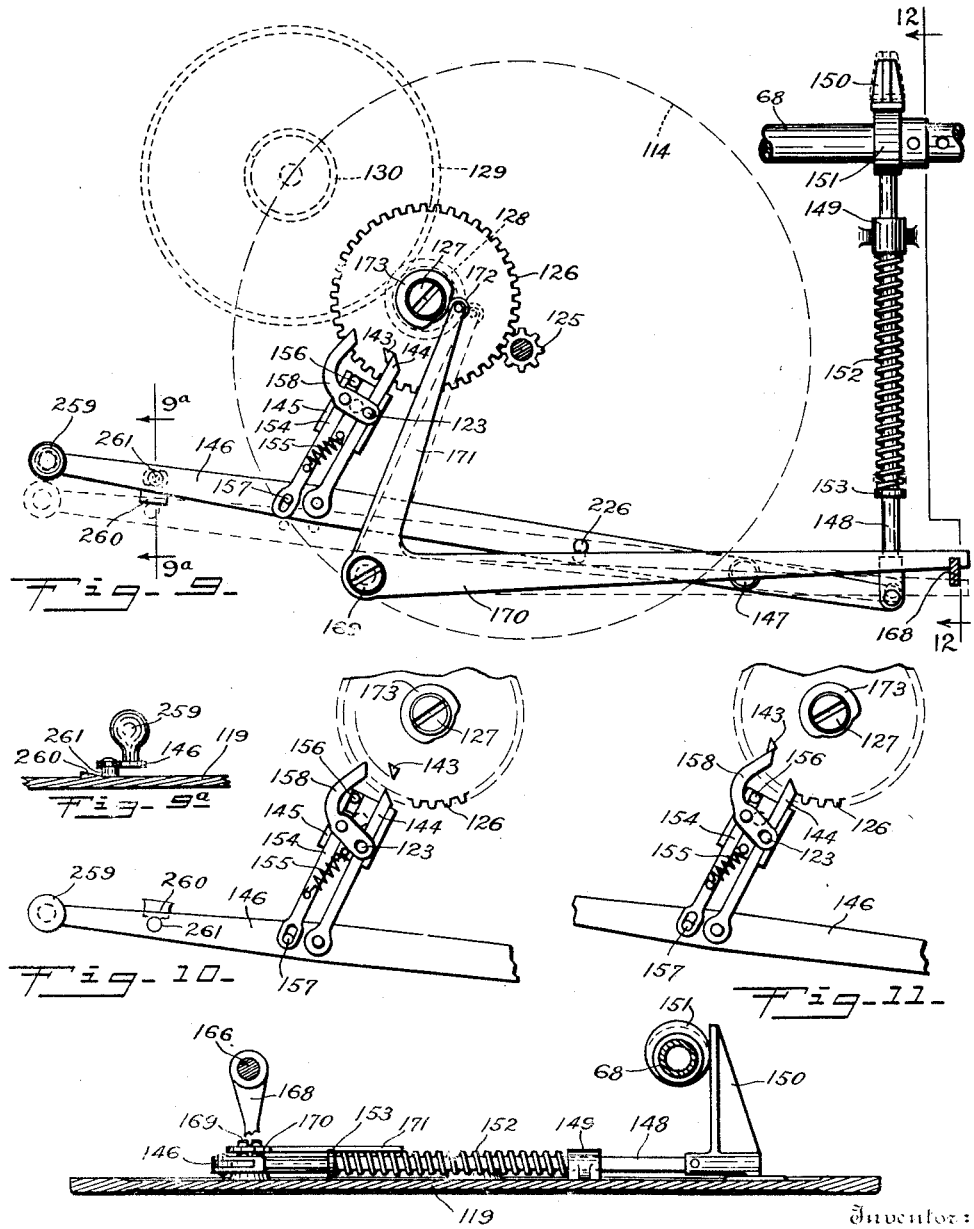

Jan. 10, 1928.
A. L. RUNYAN
1,655,510
MECHANISM FOR SELECTIVELY REPRODUCING CHARACTERS AND SOUNDS
Filed Feb. 19, 1926    8 Sheets-Sheet 8
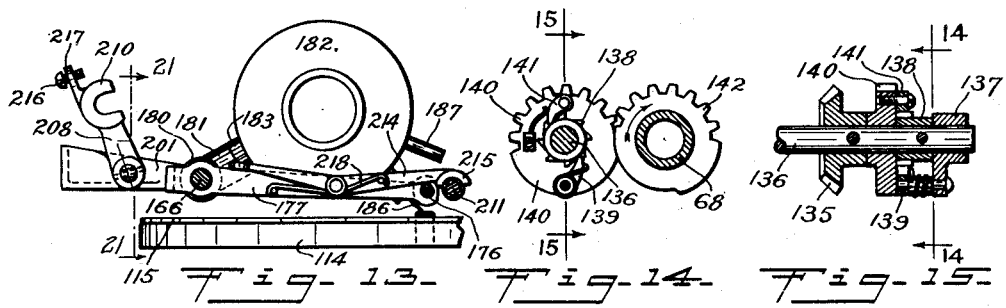
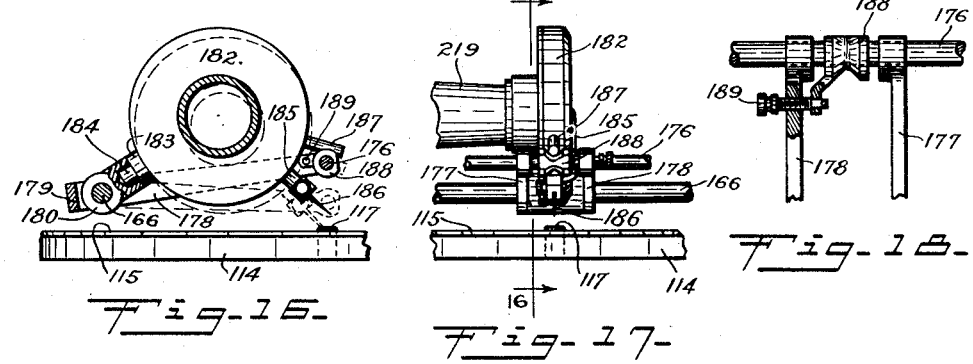
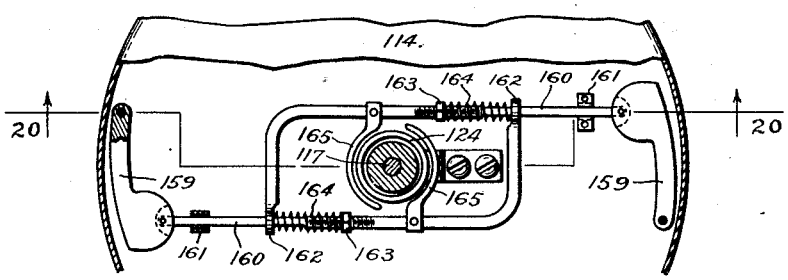
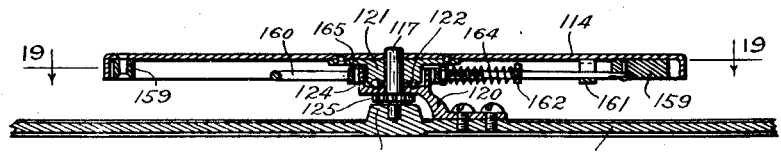
Inventor:
ARTHUR L. RUNYAN.
Witness:
R. J. Honomichl.
By David O. Barnell
Attorney.
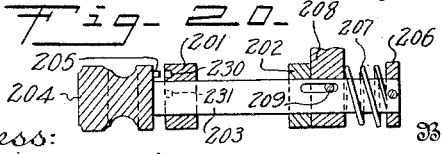

Patented Jan. 10, 1928.

1,655,510

UNITED STATES PATENT OFFICE.

ARTHUR L. RUNYAN, OF OMAHA, NEBRASKA, ASSIGNOR TO TALK-A-PRINT, TRUST, ARTHUR L. RUNYAN, TRUSTEE.

MECHANISM FOR SELECTIVELY REPRODUCING CHARACTERS AND SOUNDS.

Application filed February 19, 1926. Serial No. 89,447.

My invention relates to educational appliances, and it is the object thereof to provide a mechanism especially adapted for teaching characters and sounds, wherein character-records and sound-records of related subject matter may be employed, and selected portions of said related records reproduced simultaneously, whereby to effect combined visual and auditory impressions, of which the identity or analogy of meaning are thus established and fixed in the memory of the student. Further objects of my invention are to provide simple and positive means for effecting the selection of the portions of the records to be reproduced, means for coordinating movements of the sound and character selecting means, means for actuating both reproducing means, means for preserving the character reproductions, and means facilitating the changing of the character-records and sound-records and the index-charts common to said records. Further objects of my invention relate to specific mechanical and structural details of the mechanism by which the foregoing major functions are performed.

Mechanism embodying my invention is illustrated in the accompanying drawings, in which Fig. 1 is a perspective view of the machine, Fig. 2 is a plan view of the same, with a portion of the cover-plate of the casing broken away, Fig. 3 is an end view with the adjacent side-plate of the casing removed, Fig. 4 is a front view with portions of the front of the casing broken away, Fig. 5 is a detail transverse section of one of the rack-guides, Fig. 6 is a horizontal section on a plane above the sound-reproducing and controlling mechanism, Fig. 7 is a detail vertical section on the line 7—7 of Fig. 6, Fig. 8 is an end elevation partly broken away to show a vertical section on the plane of the line 8—8 of Fig. 2, Fig. 9 is a detail plan view of the control devices for the sound reproducing mechanism, Fig. 9ª is a detail section on the line 9ª—9ª in Fig. 9, Figs. 10 and 11 are detail plan views showing operating positions of the motor-stop device, Fig. 12 is a section on the line 12—12 of Fig. 9, Fig. 13 is a detail end view of the sound reproducer in position for continued or non-selective reproduction, Fig. 14 is a detail vertical section on the line 14—14 of Fig. 6, showing the motor-winding gears, Fig. 15 is a vertical section on the line 15—15 of Fig. 14, Fig. 16 is a detail vertical section on the line 16—16 of Fig. 17, Fig. 17 is a detail rear view of the sound reproducer and portions of its control mechanism, Fig. 18 is a detail plan view of the lifting and re-setting device for the sound-reproducer, Fig. 19 is a detail horizontal section on the line 19—19 of Fig. 20, showing the turntable governor, Fig. 20 is a vertical or axial section of the turntable, and Fig. 21 is a detail section on the line 21—21 of Fig. 13.

In the illustrated embodiment of my invention there is a substantially rectangular casing or housing consisting of a metal frame having right and left end portions 21 and 22, connected by upper and lower front members 23 and 24, and upper and lower rear members 25 and 26, the end portions of said frame being covered by sheet-metal plates 27 and 28, the front side covered by a plate 29, the rear side by a plate 30, and the top covered by a rear fixed plate 31 and a front plate 32 which is hinged to the front edge of the plate 31. Within the casing, adjacent to the upper front and rear frame-members 23 and 25, and secured to said frame members by the bolts 43, are the parallel rails 33, of which the upper edges are V-grooved to receive the rollers 34. Resting upon said rollers 34 are the V-grooved bars 35 which are secured to the front and rear end-pieces 36 and 37 of a rectangular frame or carriage formed by said end-pieces and the channel-shaped side-pieces 38. Above the rear end-piece 37 of the carriage a rod 221 is extended between the frame-members 21 and 22 to prevent lifting of the carriage from the rear rail 33. A rectangular frame 39 is mounted slidably upon said carriage, the end-pieces of said frame having flanges which extend outwardly into the grooves or channels of the side-pieces 38 of the carriage. A plurality of thin flat bars 40, disposed vertically edgewise, are extended across said frame 39 both longitudinally and transversely, forming a grid-like structure having a plurality of rectangular vertical openings therein. To the front of the grid-frame 39 is secured the end of a triangular plate 41 having the edge portions thereof turned downwardly to form flanges 42, said flanged plate forming a rigid arm which extends forwardly over the front end-piece 36 of the carriage, and projects through a horizontal slot 44 in the front casing-plate 29 and frame-member 23. To the front end of said plate or arm 41 is secured the selector-arm 45, which at its front end has an integral knob 46, the portion adjoining said knob being downwardly offset for attachment to the arm 41, as shown in Fig. 3, and the main body of the arm extending rearwardly parallel with the arm 41 but spaced upwardly therefrom sufficiently to pass above the upper edge of the casing-plate 29. Upon the rear end of the selector-arm, and normally positioned above the cover-plate 32, is a rectangular horizontal loop 47 having an opening through it of substantially the same form and dimensions as the openings between the bars 40 of the grid-frame.

Beneath the grid-carriage a pair of angle-bars 48 are arranged at a position intermediate the ends of the casing, the rear ends of said angle-bars being attached to the frame-member 25 and the front ends being attached to and supported by the front rail 33. Attached to the central portions of the bars 48, and extending upwardly therefrom to terminate immediately beneath the grid-frame 39, is a rectangular tubular guide 49 in which the rectangular plunger 50 is vertically slidable. The lower end of said plunger is vertically slotted to receive the front end of the plunger-lever 51, the rear end of said lever being pivotally connected with the frame-member 25, as best shown in Fig. 7. The plunger 50 is also slotted at its rear side to receive the cross-pin 52 at the front end of the lever, so that when the lever is actuated as hereinafter described it will move the plunger reciprocatingly within the vertical guide 49. Normally the plunger is held in lowered position shown by dotted lines in Fig. 7, at which the upper end thereof is within the guide, and by elevation from said lowered position the upper end is caused to pass into the openings between the bars 40 of the grid, as shown by the full lines in said figure, the size of the plunger being such that it will fit slidably in said grid-openings. The arrangement of the grid-frame and carriage is such that any of the openings of the grid may be disposed at the reference position, in which the respective openings are alined vertically with the plunger 50, the grid-frame being slidable longitudinally of the carriage to dispose the grid-opening of any longitudinal row at said reference position, and the carriage being movable along the rails 33 to dispose the grid-opening of any transverse row at said reference position. The longitudinal movements of the grid-frame are effected by pushing rearwardly or pulling forwardly upon the knob 46 of the selector-arm, and the movement of the carriage longitudinally of the rails 33 is caused by pushing sidewise upon said knob, the pressure transmitted, through the arm 41 and the grid-frame, to the carriage, moving the latter easily because of the anti-friction bearing afforded by the rollers 34 between the rails 33 and the track-bars 35 of the carriage. At the limits of movement of the carriage the side-pieces 38 engage the cushioning stops 53 carried upon the end-frames 21 and 22. A cushioning stop 54 is arranged at the offset or shoulder of the selector-arm, as best shown in Fig. 3, said stop being engageable with the front side of the casing to limit rearward movement of the grid-frame. The edges 55 of the upper end of the plunger 50 are bevelled so that when the plunger is raised, should the grid-openings not be accurately alined with the plunger, said bevelled edges will engage the bars 40 and cause the grid-frame to be shifted sufficiently to bring the opening into alinement. In the cover-plate 31 above the plunger 50 is an opening 56 which is of substantially the same form and dimensions as the grid-openings, and the various portions of the character-record are presented at said opening when the grid is shifted to the positions at which the grid-openings are alined with the plunger.

In the illustrated construction the character-record is a printing element formed of flexible material such as rubber, and comprises a sheet 57 of said material, having upwardly extending type-characters 58 grouped on the portions of the sheet above each of the grid-openings, and downwardly extending flange-like portions 59 which extend down into the grid-openings, said parts 58 and 59 being integral with the flexible sheet 57. The thickness of the type-sheet is such that the faces of the characters 58 are close to but not in contact with the lower side of the cover-plates 31 and 32. On the upper end of the plunger 50 is a projecting lug 60 adapted to fit within the flange-like downward projections 59 of the type-sheet, so that when the plunger is raised as shown in Fig. 7, the respective portion of the type-sheet is held centered above the plunger, while being lifted sufficiently to cause the group of characters 58 to extend through the opening 56 in the cover-plate 31, and the faces of said characters to project slightly above the surface of said cover-plate.

About the front and central portion of the cover-plate 32, portions 61 of said plate are swaged upwardly to form the rectangular border of a holder or retainer for an index-chart 63, and tongues 62 are extended inwardly from said raised or border portions 61, said tongues being adapted to extend over the edges of the card or chart 63. The chart holder extends to the front edge of the plate 32, being open at said edge, so that when said plate 32 is swung upwardly about its hinged rear edge, as indicated by dotted lines in Fig. 8, the chart may be withdrawn from or inserted into the holder, and when the cover-plate is down in its normal horizontal position withdrawal of the chart is prevented by the adjoining flange of the frame-member 23. To permit the lifting of the hinged cover-plate as above mentioned, the selector-arm is pulled forwardly until the loop 47 is displaced from above said plate, as indicated in Fig. 8, and at said position of the selector-arm the grid-frame is wholly beneath the plate 32, so that when the same is raised a type-sheet may be readily removed from or replaced upon the grid-frame. The portion of the chart 63 exposed within the holder is of the same form and dimensions as the grid-frame, and is divided into a number of rows of rectangular spaces or unit-areas, which are the same in number and arrangement as the grid-openings and the character-groups 58 on the type-sheet. The arrangement or relation of the grid-frame, selector-arm and index-chart are such that as the grid-frame is moved to dispose any of the several portions of the type-sheet or character-record at the reference position (that is, in register with the plunger 50 and the opening 56 of the cover-plate), a corresponding space or unit-area of the index-chart will be in register with the opening through the loop 47 at the rear end of the selector-arm.

On the lower portion of the end frame-member 21 is a laterally extending stud or pin 64 which projects through the side-plate 27, and upon said pin the hand-lever or crank 65 is pivotally mounted. To the hub-portion of said crank 65, inside the plate 27, is connected the gear-segment 66 which meshes with a gear-segment 67 secured on the end of the tubular main-shaft 68, said shaft extending through the lower rear portoin of the casing and being journaled in suitable bearings formed in the end-frames 21 and 22, as shown. A coil spring 69 is wound upon said shaft 68 adjacent to the frame-member 21, one end of said spring being connected with the shaft and the other end connected with the frame, as shown in Fig. 6, and the torsion of said spring tends to turn the shaft in the direction of the arrow shown on the hub portion of the segment 67, in Fig. 3, thus holding the crank 65 normally in the raised forwardly inclined position shown in said Fig. 3. Adjacent to the bearings at each end of the shaft a sector-piece 70 is secured thereto, and, between the hubs of the sector-pieces and the respectively adjacent bearings, the arms 71 are pivoted upon the shaft, said arms extending upwardly between shoulders 72 and 72' formed by offsetting the sector-arcs 73. The upper end-portions of said arms 71 are longitudinally slotted to receive slidably the inwardly projecting portions of pins 75 carried by the lower arms 74 of the rocking-levers, which are pivotally mounted near the upper rear corners of the end-frames 21 and 22. To the outer ends of the pins 75 are connected the upper ends of coil springs 97, said springs extending downwardly adjoining the outer sides of the arms 71, and the lower ends of the springs being connected with pins 98 on said arms, as shown in Figs. 3 and 8. The arrangement of the parts is such that when the crank 65 is in the normal raised position shown in Fig. 3, the sector-pieces 70 are held in the raised position shown in said figure, at which the shoulders 72' engage the arms 71, said arms being nearly vertical, the pins 75 being in the outer ends of the slots in the arms, the rocking-lever arms 74 being in a nearly horizontal position, and the springs 97 being under tension. When the crank 65 is pushed downwardly, the shaft 68 is rotated to swing the sector-pieces 70 rearwardly, and as such movement is continued the shoulders 72 engage the arms 71 and swing said arms rearwardly to positions such as that shown in Fig. 8, at which the rocking-lever-arms 74 are approximately vertical. In said Fig. 8 the arcs of travel of the ends of the arms 71 and 74 are indicated by dotted lines, and it will be seen that during the described movement the pins 75 will traverse the slots in the arms 71, passing toward the inner ends of said slots during the first portion of the movement, and returning to the outer ends of the slots at the end of the movement. It will also be seen that the springs 97 are elongated at each end of the movement, so that the spring-tension tends to assist the movement toward an intermediate position of the arms, and to resist movement thereof from the intermediate position toward either of the extreme positions, such as shown in Figs. 3 and 8. During the return movement of the crank 65 to the normal raised position thereof, the shoulders 72' of the sector-pieces engage the arms 71 for returning the same and the rocking-levers to the normal positions thereof. By reason of the above noted arrangement of the springs 97, the same serve to aid in starting the movement of the arms 71 and 74 in either direction, and to resist, and thereby cushion, the termination of the movement in each direction.

The upper arms 76 of the rocking-levers extend up through slots in the cover-plate 31, and the heads at the upper ends of said arms 76 are connected with each other by a pair of tubular rods 77, which extend across above the rear portion of the cover-plate 31. On the intermediate portions of the cross-rods 77 is mounted the tape-carrier, which has a frame comprising a lower plate 78, an upper plate 79, a pair of vertical rods 80 connecting the front portions of the plates, bolts 81 which extend vertically through the central portions of the plates, and tubular spreaders 82 which are disposed about said bolts between the plates to maintain the spacing thereof. The lower portions of the bolts 81 each extends through a pair of saddle-pieces 83, which fit about the upper and lower sides of the cross-rods 77, being clamped upon said rods by the bolts, and the frame being held thereon by the bolts, and thus fixedly connected with the cross-rods. A removable pin 84 extends vertically through the rear central portions of the plates 78 and 79, and upon said pin between the plates is revolubly mounted the reel or spool 85 for the paper-roll or tape 86, which is employed for receiving impressions from the type-characters 58. From the spool 85 the tape is extended about the roller 87 which is revolubly mounted between the frame-plates at one end thereof. At the front side of the roller 87 the tape is passed between the same and a small friction-roller 88, similarly mounted in the frame. From the friction-roller 88 the tape is extended across the frame to the feed-rollers, passing in front of the platen 89 and behind the mask-plate 90. The platen 89 is formed by a plate which extends between the rods 80 at the front central portion of the frame, the vertical edges of said plate being curled about said rods, as indicated by dotted lines in Fig. 2. The mask-plate is of the form best shown in Figs. 1 and 4, said plate having lugs 91 at its ends, connected with the frame-plates 78 and 79, the lower central portion of the mask having a rectangular opening 92 for exposing a portion of the tape, and the upper edge of the mask being cut away to expose an elongated portion of the tape adjoining the upper edge thereof. The feed-rollers 93 and 94 are, respectively, similar to the rollers 87 and 88, but the shaft of the roller 93 has a knob 95 on its upper end which may be grasped for turning the roller to actuate the tape. From the feed-rollers the tape extends through the bearing-guide 96, which is carried at the end of the frame adjoining said rollers, the outer edges of said guide being serrated as shown, to facilitate tearing off the used portion of the paper strip or tape 86. When the rocking-levers are actuated, as before described, from the normal position shown in Fig. 3, the upper arms 76 of said rocking levers are swung forwardly from the position shown by dotted lines in Fig. 8 to the full-line position in said Fig. 8, and the upper front portion of the tape-carrier is swung forwardly and downwardly in the arcuate path indicated by dotted lines in Fig. 3, the face of the platen 89 passing from the normal vertical position to a horizontal position adjoining the cover-plate 31, and the tape 86 overlying the platen being brought into contact with the type-characters 58 extending through the opening 56, as shown in Fig. 7, thus receiving an impression from the type-characters, which are previously inked, as will now be described.

An ink-pad 99 is normally positioned above the opening 56 in the plate 31, through which the type-characters are elevated to the printing position, so that the raising of the type-characters causes the same to be pressed against said pad to receive ink therefrom. The ink-pad 99 is connected pivotally with a pair of arms 100 carried by a small shaft 101 which forms also the pintle of the hinge connection between the cover-plates 31 and 32. Fingers 102 are extended forwardly from the ink-pad, and to the ends of said fingers are pivotally connected the links 103, the other ends of said links being pivoted to small lugs on the plate 32, and the links being parallel with and of the same length as the arms 100. At one end the shaft 101 carries a pinion 104 which extends through a slot in the cover-plates and is covered by a guard 105 hinged to the rear cover-plate, as best shown in Fig. 8. The pinion 104 meshes with a rack 106 which is slidably supported in guides 107 on the frame-member 22. A connecting-bar 108 has the ends thereof pivotally connected with a lug on the rack 106 and to the lower arm 74 of the adjacent rocking-lever, so that during the movements of the rocking-levers the rack is reciprocated between the positions shown in dotted and full lines in Fig. 8. In the normal position of the rocking-levers, the described rack and pinion connection causes the shaft 101 to be held at a position such that the arms 100 hold the ink-pad above the opening 56, but during the swinging of the rocking-levers by which the tape-carrier is moved down to the printing position, as before described, the shaft 101 is rotated to swing the arms 100 forwardly. During such movement the ink-pad is retained in a substantially horizontal position by the parallel links 103, and at the end of the forward swinging movement of the pad the same is pressed upon the ink-supply pad 109, which is disposed upon the plate 32 at the rear side of the chart-holder, as represented in Fig. 7. After the printing operation, when the tape-carrier is swung upwardly to normal position, the reverse movement imparted to the rack 106 actuates the pintle-shaft 101 to return the ink-pad to normal position above the print-opening 56.

At the longitudinal center of the main-shaft 68 an arm 110 is secured thereto, and when the shaft is in its normal position, corresponding with the raised position of the hand-lever or crank 65, said arm extends forwardly from the shaft, as indicated by the dotted outline thereof in Fig. 7. At the front end of the arm 110 is a small roller 111 which, when in normal position, engages a flange 112 on the plunger-lever 51, and extends beneath the front end of an arc-bar 113 which is secured to the side of said lever. During the rotation of the main-shaft caused during the first portion of the downward movement of the hand-lever 65, the arm 110 is swung upwardly and the roller 111 pressed against said end of the arc-bar to raise the plunger-lever to the full-line position thereof shown in Fig. 7. At the conclusion of said lifting movement the roller 111 passes out of engagement with the end of the arc-bar and into engagement with the concave lower edge thereof, which is so formed as to be concentric with the shaft 68 when the plunger-lever is in the raised position. Thus the movement of the main-shaft and arm 110 may be continued until said arm is approximately vertical, the roller 111 serving to hold the plunger-lever in raised position, but causing no further elevation thereof. Upon the return movement of the main-shaft and arm 110, the roller engages the flange 112 to pull the lever and plunger down to the normal or initial position. It will be noted that during that portion of the movement of the main-shaft in which the plunger is being elevated, the sector-pieces 70 start the rearward swinging movement, preliminary to engagement of the shoulders 72 with the arms 71 to actuate the rocking-levers and swing the tape-carrier to the printing or impression position. As the forward swinging of the ink-pad is controlled by the rocking-levers, and occurs simultaneously with the swinging of the tape-carrier to the impression position, it will be seen that when the type-sheet is first raised by the plunger the ink-pad will be still in position above the opening 56, so that the characters 58 will receive ink from the pad before the latter is moved away from the opening, and the type will continue to be held up until the tape-carrier has moved to the impression position.

Adjacent to the bottom of the casing is arranged a horizontal turntable 114 adapted to support and actuate a disk sound-record 115 having a continuous spiral record-groove in the face thereof, the lateral undulations of the record-groove being adapted to actuate the stylus of a reproducer and vibrate the diaphragm thereof according to the recorded sounds. A door 116 in the rear side-plate 30 affords access to the casing for the placing of the record upon the turntable, and removal of the same therefrom. The vertical shaft 117 projects slightly above the upper surface of the turntable, whereby to enter the center-hole of the record and insure the correct placing of the disk upon the table. The lower end of the shaft 117 is seated in a bearing 118 on the bottom-plate 119 of the casing, and a bearing-bracket 120 is secured to the bottom-plate, the head of said bracket extending beneath the hub 121 of the turntable, as shown in Fig. 20. The adjoining faces of the bracket-head and hub 121 are annularly grooved concentrically with the shaft to form races for balls 122, which provide an anti-friction bearing for receiving the thrust due to the weight of the turntable and record. An annular flange 124 is formed integrally with the bracket-head, and extends about the hub 121 to form a drum for engagement with the governor-brake as hereinafter described. A drive-pinion 125 is secured upon the shaft 117 between the bearing 118 and the bracket-head, said pinion meshing with a gear 126 revolubly mounted on a suitable stud 127. A pinion 128 is secured to the gear 126 and meshes with a gear 129, the latter having secured thereto a pinion 130 which meshes with the main gear 131. Said gear 131 carries a drum 132 for inclosing a suitable motor-spring (not shown), the gear and drum being revoluble about the shaft 133 to which the inner end of the motor-spring is connected. A small bevel gear 134 is secured upon the upper end of the shaft 133, said bevel gear meshing with a similar gear 135 which is secured upon the horizontal winding-shaft 136. One end of said shaft is journaled in the end-frame 22, and said end of the shaft is squared or otherwise suitably shaped for engagement with a winding-key or crank. The inner end of the winding-shaft is supported by a bearing-bracket 137 which is extended forwardly from the frame-member 26, and has an intermediate portion forming a support-bearing for the main-shaft 68, with which the winding-shaft is parallel. A ratchet-wheel 138 is secured to the winding-shaft adjoining the bearing-bracket, and a pawl 139 is mounted on bracket for engaging the ratchet-wheel to prevent reverse rotation of the shaft by the tension of the motor-spring. An interrupted gear 140 is mounted revolubly upon the winding-shaft between the ratchet-wheel 138 and the bevel gear 135, as shown in Fig. 15, said gear 140 carrying a pawl 141 which engages the ratchet-wheel. An interrupted gear 142 is secured on the main-shaft 68, and the teeth of said gear 142 are adapted to mesh with the teeth of the gear 140 to rotate the latter a limited amount during each movement of the shaft in the direction of the arrow in Fig. 14, the teeth passing out of engagement when the gears are at the position shown in said figure, so that further rotation of the shaft may occur without actuating the gear 140. During the reverse movement of the shaft 68 the teeth of the interrupted gears come into mesh at the position shown in Fig. 14, the gear 140 then being actuated to cause a retrograde movement of the pawl 141 relative to the ratchet-teeth, while the pawl 139 retains the ratchet-wheel in the position to which it is advanced by the forward movement of the gear. By means of the described devices, a limited winding of the motor-spring is caused by each operation of the crank 65 to actuate the main-shaft 68, as described in connection with the printing operation.

The turntable is driven by the motor-spring through the gear-train formed by the gear 131, pinion 130, gear 129, pinion 128, gear 126, and pinion 125, and under control of the devices shown in detail in Figs. 9 to 12, inclusive. On the gear 126 is a stop-lug 143 which normally engages the latch-bar 144 and prevents rotation of the gear. Said latch-bar is held in a guide-block 145 which is pivotally connected with the bottom-plate of the casing, the bar being slidable through said guide-block in a direction approximately radial to the gear. The end of the latch-bar is connected pivotally with a control-lever 146, said lever being fulcrumed on a pin 147 affixed to the bottom-plate 119 of the casing, and to the short arm of the lever is pivotally connected a rod 148 which extends rearwardly through a guide-lug 149 on the bottom-plate. At the rear end of the rod 148 is a head 150 which extends up adjacent to the main shaft 68 so as to be engageable by a cam 151 secured upon said shaft. A coil spring 152 is disposed around the rod 148, one end of said spring engaging the guide-lug 149 and the other end of the spring engaging a collar 153 on the rod, so that the pressure of said spring upon said collar tends to hold the head 150 in engagement with the cam 151, and to move the lever 146 about its fulcrum 147 in a direction for moving the latch-bar into position for engagement by the stop-lug 143. When the shaft 68 is turned to cause the printing operation, the cam 151 pushes the head 150 rearwardly, and moves the control-lever to disengage the latch-bar from the stop-lug, thereby permitting operation of the motor-gear-train to rotate the turntable. If the hand-crank is released, so that the main-shaft is returned to normal position before the gear 126 makes a complete revolution, the end of the latch-bar is again disposed in the path of the stop-lug, and the rotation of the gear is thereby stopped at the completion of one revolution, or when the turntable has made a definite number of revolutions, as determined by the ratio of the gear 126 to the pinion 125. To prevent continued rotation of the gear 126 should the hand-crank be held down and the main-shaft not returned to normal position promptly, an additional stop-device is provided, as follows: A bar 154 is disposed slidably in a groove in the guide-block 145 parallel with the latch-bar 144, a small spring 155 being connected with said bar 154 and with the guide-block, and said spring normally holding the end of said bar against a pin 156 arranged in the groove of the guide-block at the end thereof adjacent to the gear.

The opposite end of said bar 154 has a short longitudinal slot into which is extended a pin 157 on the control-lever 146. During the normal movement of the control-lever caused by the cam 151, the pin 157 merely moves reciprocatingly in the slot of the bar 154, and the position of said bar relative to the guide-block 145 remains unchanged. An angle-lever 158 is mounted pivotally on the bar 154, one end of said lever extending in over the gear 126 adjacent to the path of the stop-lug thereon, and the other end of the angle-lever extending across the latch-bar and having a short slot therein, a pin 123 on the latch-bar extending up through said slot. The arrangement is such that when the latch-bar is withdrawn from engagement with the stop-lug by the normal movement of the control-lever, the angle-lever is swung to a position such as shown in Fig. 11, at which the end of said lever is interposed in the path of the stop-lug. Thus, if the control-lever is held at the release position, rotation of the gear 126 is stopped by the angle-lever when the gear has made slightly less than a complete revolution, and when the control-lever is returned to normal position, so that the latch-bar is again in position for engagement by the stop-lug, the latter is released by the angle-lever, so that a slight additional movement of the gear will again engage the stop-lug with the latch-bar, and the parts all be again in the initial positions shown in Fig. 9. The latch-bar and angle-lever thus constitute a sort of escapement device which automatically prevents the gear 126 making more than one revolution, regardless of the time that the hand-crank may be held in depressed position and the main-shaft thus prevented from returning to normal. Should it be desired to permit continuous rotation of the turntable, the same may be effected by manually placing the control-lever in a position such as shown by dotted lines in Fig. 9, this requiring a greater movement of said lever than is caused by the cam 151. The long arm of the control-lever is provided with a knob 259 for convenience in moving the same manually, said knob being accessible when the front cover-plate 32 is lifted as hereinbefore described, and a detent-lug 260 is formed on the bottom-plate, as best shown in Fig. 9ª, for engagement with a pin 261 on the lever to retain the same at the continuous-release position. In the movement of the lever to said position the pin 157 engages the end of the slot in the head of the bar 154, and moves said bar against the tension of the spring 155 sufficiently to effect the withdrawal of the angle-lever 158 from the path of the stop-lug, as shown in Fig. 10, so that rotation of the turntable may continue until the control-lever is released from the detent-lug 260. When the turntable is driven continuously, the motor-spring must be wound by the application of a key or crank to the squared end of the shaft 136, as the re-winding of the motor-spring automatically, through the interrupted gears 140 and 142, is so proportioned as to compensate only for the driving of the gear 126 one revolution.

A governor, for controlling the speed of rotation of the turntable, is formed by weighted levers 159, pivoted on the lower side of the turntable within the peripheral flange thereof, each of said levers having pivotally connected therewith a rod 160 which extends loosely through a guide 161 and past the brake-drum 124, the end portion of each rod being turned laterally and provided with a terminal eye 162 fitting slidably upon the main portion of the other rod, as best shown in Fig. 19. A portion of each rod 160 is threaded and provided with an adjusting-nut 163, and springs 164 are disposed about the rods between said adjusting-nuts and the eyes 162. Brake-shoes 165 are secured to the rods, as shown, and extend in proximity to the drum 124, the arrangement being such that when the centrifugal outward pull of the weighted levers 159 exceeds the pressure of the springs 164, the brake-shoes will be pressed against the drum 124 and thus control the speed, according to the spring-pressure as adjusted by the nuts 163.

In the lower front portion of the casing is arranged the horizontal rocking-shaft 166 of which the end portions are journaled in suitable bearings in the end-frames 21 and 22. Adjacent to the frame-member 21 a spring 167 is coiled about the shaft, one end of said spring being attached to the frame and the other end connected with the hub of an arm 168 which is secured to and extends downwardly from the shaft. The tension of said spring 167 tends to so rotate the shaft as to swing the lower end of said arm 168 rearwardly. The swinging of said arm, and the resultant rocking movements of the shaft, are controlled by the angular cam-lever which is fulcrumed on a stud 169 on the bottom-plate 119 of the casing. Said cam-lever consists of a long arm 170 which engages the rear side of the arm 168 near the lower end thereof, and a second arm 171 which extends rearwardly above the gear 126, the end of said arm carrying a small roller 172 which engages a cam 173 secured to said gear 126, as shown in Fig. 9. By rotation of said gear and cam the cam-lever is moved between the positions shown by full and dotted lines in Fig. 9, the arm 168 being thereby actuated and the shaft 166 rocked or oscillated accordingly. A pair of arms 174 and 175 are secured to the rocking-shaft and extend rearwardly therefrom; the arm 174 extending approximately over the center of the turntable, and the arm 175 being adjacent to the end-frame 22. A rod 176, parallel with the rocking-shaft, connects the rear ends of said pair of arms. Between the arms 174 and 175 a pair of parallel bars 177 and 178 are mounted slidably upon the shaft 166 and rod 176, the front ends of said bars being fixedly connected with each other by a cross-piece 179 formed integrally therewith. Between said bars 177 and 178 the swivel-block 180 is mounted slidably and pivotally upon the shaft 166, said block having a tubular neck 181 extending diagonally upward and rearward. The sound-box 182 has upon the front side thereof a fixed boss 183 which engages the end of the neck 181 of the swivel-block, and from said boss a swivel-pin 184 extends into said neck 181, as shown in Fig. 16, whereby the sound-box is supported upon the swivel-block so as to be tiltable therewith about the shaft 166, and also swingable about the inclined axis of the swivel-pin 184, which is so directed that its axis continued would extend through the centers of the rocking-shaft and sound-box. The stylus-lever 185 is arranged substantially at a right angle with the axis of the swivel-pin, and by the swinging of the sound-box about the swivel-pin-axis the stylus 186 may have a limited movement laterally of the record-disk 115, while the stylus may be raised from or lowered onto the record-disk by swinging of the sound-box and swivel-block in a vertical plane about the axis of the shaft 166. The parts are so proportioned that the stylus will engage the record-disk substantially upon a radius thereof which is parallel with the rocking-shaft 166. At the rear side of the sound-box a pin 187 extends out radially therefrom, said pin being positioned above a V-grooved centering-block 188, which is mounted slidably upon the rod 176, and is connected with the bar 178 by an adjusting-screw 189, as best shown in Fig. 18. By means of said screw 189 the position of the centering-block may be adjusted with exactness, relative to the bars 177 and 178. When the rocking-shaft 166 is moved to raise the arms 174 and 175, the resulting lifting of the rod 176 causes the centering-block to engage the pin 187, and the weight of the sound-box, resting upon said pin, causes the same to be seated in the bottom of the V-groove of the block, the sound-box swinging about the axis of the swivel-pin to allow the required lateral movement of said centering-pin 187. In the normal positions of the parts, the rocking-shaft 166 is held by the spring 167 in a position such that the rod 176 is in the raised position shown in Fig. 16, the centering-pin 187 resting in the groove of the centering-block 188, and the stylus 186 being held out of engagement with the record-disk. When the cam-lever is actuated to the position shown by dotted lines in Fig.

9, and the lower end of the rocking-shaft-arm 168 is thereby pushed forwardly, the arms 174, 175 and rod 176 are swung downward to the position shown by the dotted lines in Fig. 16, the sound-box being thereby lowered until the stylus engages the record-disk, and the centering-block 188 being then disengaged from the pin 187, to allow swinging of the sound-box about the axis of the swivel-pin 184, and thus enable a limited swinging of the stylus laterally of the record-disk as before mentioned.

The major movements of the sound-box, relative to the record-disk upon the turntable, are effected and controlled by the movements of the selector-arm 45 to position the loop 47 thereof over the index-chart 63, the connecting means for so actuating and controlling the sound-box or reproducer from the selector-arm being as follows: A rack 190 is arranged to extend longitudinally beneath the front end-piece 36 of the grid-carriage, said rack being slidably connected with said end-piece 36 by means of a screw 191 and slide-block 192 which are secured to the rack and extend into longitudinal slots in the member 36, as best shown in Fig. 4. Upon the upper side of the slide-block 192 are a pair of small rollers 193, so arranged that one of the flanges 42 of the grid-arm 41 extends between them. By reason of the diagonal direction of said flange 42, the movements of the selector-arm in and out, for moving the grid-frame back and forth within the carriage, cause the slide-block 192 to be moved longitudinally of the slot in the member 36, and corresponding movements are imparted to the rack 190. The rack is also movable with the carriage when the same is moved along the rails 33 longitudinally of the casing. The latter movements of the rack relative to the casing are greater, of course, than the movements thereof effected by the shifting of the grid-frame, the parts being so proportioned that the entire movement of the rack caused by motion of the grid-arm relative to the carriage is slightly less than that caused by the shifting of the carriage when the selector-arm is moved to displace the loop 47 from register with one transverse row of the spaces on the index-chart, to register with the next adjacent row. The rack 190 meshes with a gear 194 which is revolubly mounted upon a pin 195 carried upon a vertical center-piece 196 connecting the upper and lower front frame-members 23 and 24. A pinion 197 is secured to said gear 194 concentrically therewith, and said pinion meshes with a rack 198 which is mounted slidably in guides 199 secured to the adjacent rail 33, as shown in Figs 4 and 5. A plate 200 is secured to the inner side of the rack 198 and extends downwardly therefrom to the level of the rocking-shaft 166. Upon the lower portion of said plate 200 is secured a bracket having an arm 201 of which the rear end portion fits slidably upon the rocking-shaft adjoining the bar 178. A flanged portion of the bracket has a bearing-lug 202 thereon, and in said lug and intermediate portion of the arm 201 a small shaft 203 is held slidably and rotatably. At the end adjoining the arm 201 said shaft has a knob or head 204, and at the inner side of said head is a pin 205, indicated in Figs. 6 and 21, said pin being adapted to enter holes 230 and 231 formed in the adjacent side of the arm 201, to thereby inhibit rotation of the shaft. At the end opposite the head 204, said shaft 203 carries a collar 206, and a spring 207 is disposed about the shaft between said collar and the hub portion of an arm 208, through which the shaft passes slidably, the pressure of the spring tending to hold said arm against the side of the bearing-lug 202. A pin 209 extends through the arm and a slot in the shaft 203, as shown in Fig. 21, said pin causing the arm to be rotated with the shaft, but allowing a slight longitudinal movement of the shaft relative to the arm. Upon the end of the arm 208 is a notched head 210 which normally fits over the rocking-shaft 166 adjoining the side of the bar 177, and the arms 201 and 208 thus straddle the sound-box-slide (formed by the parts 177, 178, 179, 180 and 188), so that the longitudinal movements of the rack 198 are communicated to said slide, and the same thereby moved longitudinally of the shaft 166 and rod 176.

The arm 208 may be disposed in the raised position shown in Fig. 13, by first pulling upon the head 204 of the shaft 203 to disengage the pin 205 from the hole 231 in the arm 201 in which it is engaged when the arm 208 is in the normal position, then turning the shaft to raise the arm, and finally releasing the head to allow the tension of the spring 207 to move the shaft slightly and cause the pin 205 to enter the hole 231 in the side of the arm 201, by which the arm 208 is retained in the raised position. When the notched head 210 is disengaged from the rocking-shaft, by raising the arm 208 as above described, the sound-box-slide is freed from the control of the selector-arm, and may be moved to the right along the shaft 166 and rod 176, so that the stylus may traverse the record-disk under control of the following means: A shaft 211 has the end portions thereof journaled in the end-frames 21 and 22, and extends longitudinally of the casing above the turntable, slightly rearward of the center thereof. Adjacent to one side of the turntable a star-wheel 212 is secured upon said shaft 211, the arms of said star-wheel extending down past the side of the turntable as shown in Fig. 3, so that at each revolution of the table one of said star-wheelarms will be engaged by a pin 213 which projects radially from the side of the table, and the star-wheel and shaft thus rotated an amount corresponding with the spacing of the arms. The portion of the shaft 211 adjacent to the rod 176 is threaded, and upon the side of the arm 177 a feed-lever 214 is pivotally mounted, said lever having an arm which extends rearwardly above the rod 176 and carries at the end thereof a head 215 having a concave lower side provided with threads adapted to fit into the threads of the shaft 211. The parts are so proportioned and related that when the half-nut, formed by the head 215, is engaged with the lead-screw, formed by the threaded portion of the shaft 211, the star-wheel causes the lead-screw to be so turned at each revolution of the turntable as to advance the sound-box-slide a distance equal to the pitch of the record-grooves. When the rocking-shaft is rotated to raise the lifting-rod 176 for disengaging the stylus from the record, the half-nut 215 is also raised out of engagement with the lead-screw. When the control-lever 146 is moved to the extreme position shown by dotted lines in Fig. 9, for fully releasing the stop-mechanism as before described, a pin 226 on said control-lever is engaged with the long arm 170 of the cam-lever, pushing the same forwardly and actuating the rocking-shaft-arm 168 to lower the sound-box and engage the stylus with the record. The return of the control-lever to normal or stopping position releases the cam-lever, of course, so that the spring 167 may actuate the rocking-shaft for raising the sound-box and disengaging the stylus from the record, and the same movement of the control-lever serves to stop the rotation of the turntable and to raise the half-nut from the lead-screw.

When the arm 208 is in the normal position at which the notched head 210 is engaged with the rocking-shaft, a screw 216, carried by a lug 217 on the head 210, engages the forwardly extending arm of the feed-lever, pressing said front arm of the lever downwardly and raising the rear arm thereof to a position such that the half-nut 215 is not engaged with the lead-screw when the sound-box is lowered to the reproducing position. A spring 218 is connected with the feed-lever and bar 177, and tends to swing the rear arm of the lever downwardly into engagement with the rod 176 when the screw 216 is raised by the movement of the arm 208 up to the release position shown in Fig. 13.

The sound-box has fixedly connected therewith a small amplifying horn 219, of which the mouth is directed toward the front of the casing adjacent to a screened opening 220 in the front side-plate 29, and the sound-box and horn are so proportioned that their center of gravity will be rearward of the rocking-shaft sufficiently to cause a suitable pressure of the stylus upon the record-disk when the same is engaged therewith.

It will be understood that the described means for releasing the sound-box slide from the control of the selector-arm, for actuating the sound-box-slide by the lead-screw, and for setting the stop-mechanism to allow continuous rotation of the turntable, are employed only when it is desired to reproduce continuously all of the matter contained upon a record-disk, and that normally the subject matter upon the sound-record is reproduced selectively, or the various portions of the record reproduced according to the selection afforded by disposing the reproducer in operative relation to definite parts of the record, under control of the selector-arm.

The relation of the subject matter shown by the insignia upon the index-chart to the subject matter upon the accompanying sound-record, may be best understood by referring to Figs. 2 and 6. In Fig. 2 the transverse rows of spaces or unit-areas upon the index-chart are designated as A, B, C, D, E, F, and G, and the subject matter of the several rows of spaces corresponds with that on the sound-record in the several annular spaces marked in Fig. 6 with the same reference letters. The subdivisions of the first row A upon the index-chart are designated as $a^1$, $a^2$, $a^3$, $a^4$, $a^5$, $a^6$ and $a^7$, which correspond in subject matter, respectively, with the similarly designated subdivisions of the major division A of the sound-record, as shown in Fig. 6. When the selector-arm is positioned to indicate the space $a^7$ upon the index-chart, as shown in Fig. 2, the sound-box is so positioned that the stylus is at the beginning of the subdivision $a^7$ of the sound-record. Should the sound-box be lowered to reproducing position, the sounds recorded on this portion of the record will be reproduced, the required lateral or traversing movement of the stylus being permitted by the swivelling of the sound-box upon the neck 181 of the swivel-block. When the sound-box is again lifted to disengage the stylus from the record-disk, the engagement of the pin 187 in the V-groove of the centering-block 188 causes the stylus to be restored to its initial position above the starting portion of the subdivision $a^7$, so that the reproduction of this portion of the record may be repeated if desired. Movement of the selector longitudinally of the index-chart to place the loop 47 in register with another of the transverse rows of spaces or unit-areas thereon, causes the sound-box to be likewise moved to place the stylus in operative relation with the corresponding portions of the sound-record. Movement of the selector to dispose the loop 47 in register with different spaces of the same row, causes the rack 190 to be actuated by the grid-arm-flange 42 and rollers 193, and said movements of the rack 190 are transmitted by the described connection to the sound-box-slide, to effect the disposal of the stylus over the appropriate subdivision of the sound-record. For example, if the selector is moved rearwardly from the position shown in Fig. 2, so that the loop 47 passes from register with the space $a^7$ to the space $a^3$, the position of the stylus is changed from the beginning of the subdivision $a^7$ of the sound-record to the beginning of the subdivision $a^3$ of said record. It will be understood, of course, that each of the subdivisions of the sound-record, $a^1$, $a^2$, etc, contains a plurality of turns of the record-groove, and, preferably, at the starting portion of each subdivision one or more turns of the groove are blank, so that the stylus may be first engaged in such blank portion of the groove, and move into the sound-inscribed portion of the groove as the rotation of the turnable proceeds.

Referring again to Fig. 2. it will be noted that the several rows of character-groups upon the printing-element carried by the grid-frame 39 are designated by reference-letters A, B, C, D, E, F and G, and that the subdivisions of each row are also designated similarly to the subdivisions of the corresponding rows upon the index-chart. It will be seen that when the selector-loop is placed in register with a space or unit-area of the index-chart, the similarly designated portion of the printing-element or character-record will be disposed at the reference position, or in register with the opening 56 in the cover-plate, above the lifting-plunger 50 and beneath the ink-pad 99. Thus at the position of the selector shown in Fig. 2, the space $a^7$, containing the word "Boy", is in register with the loop 47, and the type-characters forming the same word are at the reference position or printing position. If the selector be moved, for example, to the space $g^4$ of the index-chart, containing the pictorial representation of a ball, the corresponding space or subdivision of the character-record, containing the type-characters for printing the word "Ball", will be disposed at the reference position, so that when the crank 65 is operated said word will be printed upon the portion of the tape 86 appearing above the opening 92 of the mask-plate on the tape-carrier.

It will now be clearly apparent that the operation of the selector to dispose the loop 47 in register with any of the several portions of the index-chart, causes a corresponding portion of the character-record, containing subject matter related to that indicated upon the chart, to be disposed at the reference position or printing position; and the same movement of the selector causes the sound-reproducer to be disposed in operative relation to a portion of the sound-record containing subject matter related to that on the character-record at the reference position, and to that indicated upon the index-chart by the registry of the loop therewith. The correlation of the foregoing elements being clearly understood, the operation of the mechanism as a whole may now be considered, and as an example, let it be assumed that the mechanism is provided with correlated records of sounds and characters, index-chart, and tape-roll suitable for the first instruction of young children in reading. In such case all of the spaces or unit-areas of the index-chart may contain pictorial representations of different objects familiar to the child, such as the house and ball represented at the spaces $f^4$ and $g^4$ on the chart in Fig. 2; the character-record or printing-element may contain upon the corresponding portions thereof the type-characters for printing the names of the various objects represented pictorially upon the index-chart; the sound-record may contain upon the corresponding portions therof the necessary undulations of the record-groove for reproducing the sounds of the spoken words to name the various objects represented by pictures upon the index-chart and by type-groups upon the character-record; and the tape-roll may have printed thereon several series of pictures corresponding with the pictures upon the index chart, said pictures being so located upon the tape that they may be exposed successively at the opening 92 in the mask-plate at the front of the tape-carrier, and each object preferably being represented a number of times in the whole length of the tape. Such records, chart and tape having been placed in the machine, the tape is moved until the picture of some object appears at the mask-opening 92, and the child is first instructed to find the corresponding picture upon the index-chart, then to place the selector so that said picture is seen through the loop 47, and then to pull down upon the hand-lever or crank 65. During the first portion of the downward movement of the crank 65, the plunger 50 is elevated, and the entry of said plunger in the grid-opening accurately centers or alines the selecting devices, should the same not have been precisely positioned prior to operating the hand-lever. The raising of the plunger elevates the type-sheet, causing the characters thereon to protrude through the opening 56 and to be pressed against the ink-pad. Also, during the first portion of the downward movement of the hand-lever the motor-spring is wound, through the operation of the interrupted gears 140 and 142, and the sector-pieces 70 are swung to position for engaging the arms 71. During the last portion of the downward movement of the hand-lever, the arms 71 are actuated, and the tape-carrier is swung down to the horizontal position at which the tape is pressed against the inked type-characters, the ink-pad being withdrawn at the proper time to expose the type at the opening 56. The cam 151 is actuated by the main-shaft to operate the control-lever 146 and release the cam-gear 126, thereby allowing the motor-gear-train to actuate the turntable. After the turntable has made one or two revolutions, so as to attain a normal reproducing-speed, the cam-lever 170—171 is actuated by the cam 173 to engage the rocking-shaft-arm 168, and the rocking-shaft is thereby actuated to lower the sound-box into reproducing position. When the cam-gear 126 approaches the end of one revolution, the cam 173 allows the cam-lever to return to normal position, so that the spring 167 may restore the rocking-shaft to normal position and thus lift the sound-box or reproducer to disengage the stylus from the record-disk. Upon releasing the crank 65 at the end of the downward stroke thereof, the spring 69 returns the main-shaft and its connected parts to normal position, said return movement of the main-shaft returning the tape-carrier to normal vertical position, and the ink-pad is at the same time moved back to place over the print-opening 56. The net result of the operation of the crank 65 is that the name of the object selected upon the index-chart is printed upon the tape 86 above the pictorial representation of the object at the mask-opening 92, and the same name or word is pronounced or spoken by the operation of the sound-reproducing mechanism.

The child is thus shown a picture, sees the printed word, naming the object in the picture, appear upon the tape above the picture, and hears the correct pronunciation of the printed word. The visual and auditory presentation of the word may be repeated as often as desired by merely pulling down the crank or hand-lever for each repetition, without changing the position of the selector. It will be obvious that a child, having learned the way to operate the machine, will be induced to continue the operation, through natural curiosity and for the amusement afforded by seeing the printing of the words upon the tape to name the various pictures, and by hearing the words or names spoken by the machine. By repetitions of the combined visual and auditory reproduction, the appearance of the printed words and the sounds of the spoken words become associated in the memory, and the child thus quickly learns to recognize the printed word as having the same meaning as the associated picture and spoken word, and is thus able to read the printed words which he has so learned. After becoming familiar with the printed words, the index-chart containing the pictures may be removed, and another substituted therefor having thereon the printed words learned by the use of the picture-chart. With the latter index-chart a tape-roll may be employed having incomplete sentences printed thereon, such that the completion of any sentence may be effected by printing in one or more of the words already learned, and a key to the missing words furnished by pictorial representation of the objects referred to. For example, as shown in Fig. 4, the exposed portion of the tape has the incomplete sentence "The —— is running" and beneath the space for receiving the missing word is the picture of a boy running. The child, being already familiar with the word "Boy," selects this word upon the index-chart, pulls the hand-lever, thus causing the word to be printed upon the tape, and the voice from the sound-reproducer, which is supplied with a suitable record for this purpose, repeats the entire sentence. By this means the child attains familiarity with the additional words employed in the sentence, and such words, which may be parts of speech incapable of pictorial indication, are thus added to the reading vocabulary of the child. By the preservation of the character reproductions upon the tape 86, the parent or teacher may correctly estimate the progress made by the child, as the used portions of the tape, torn off from time to time at the tearing-guide, will show the number and nature of any errors made, and a rating of proficiency may thus be readily deduced.

It will be seen from the foregoing examples that the system of instruction may be continued and elaborated to any extent desired. It should be noted, further, that the subject matter upon the several portions of the sound-records and character-records, and upon the index-chart, need not be limited to single words, and that, except for primary or elementary instruction, each subdivision of the chart and records may contain a plurality of words, to form a phrase or sentence. Foreign languages may be taught by the use of index-charts containing in each space a word, phrase or sentence printed in the language known to the student, while in the corresponding spaces of the character-record and sound-record the same subject matter is expressed in the language to be learned. The student, by selecting the desired subject matter in the known language upon the index-chart, and operating the hand-lever of the machine, causes the printed translation of the sentence, phrase or word to appear, and at the same time hears the translation spoken by the sound-reproducer. The advantage to the language student, of hearing the correct pronunciation of the foreign words, and combinations thereof in phrases and sentences, at the same time that he sees the same represented in printed form, and the convenience of being enabled to have the pronunciation repeated as often as desired, will be clearly obvious. It may be noted, also, that as the presentation of the new or unknown expression of subject matter is limited at any one time to what is contained upon one subdivision of the records, the attention of the student is more definitely fixed and concentrated than would be possible by the use of a book for the character presentation, or of continuously reproduced sound-records for the sound presentation.

When employed for such uses as the study of foreign languages, the printing operation may be dispensed with, the tape-carrier and ink-pad being omitted or removed from the machine, and the character-record being adapted for direct observation of the selected portions thereof at the reference position established by the opening 56 of the cover-plate.

In addition to its use for teaching the reading and speaking of language, either for primary instruction in the native tongue or for the learning of foreign languages, my mechanism may be advantageously employed, in connection with suitable records, for instruction or examination in various subjects wherein it is required that related subject matter become known under different forms or modes of expression. The principle common to all uses is, however, that the known form or mode of expression of the subject matter is shown upon the index-chart, and the related but unfamiliar form or mode of expression is reproduced selectively from the character-record or sound-record, or both.

As an example of such further uses of the mechanism, a child, having learned to read matter printed in capitals or upper-case letters only, may be taught to read matter printed in lower-case letters, by using the latter upon the character-record, in connection with an index-chart printed in the familiar capitals or upper-case letters.

Writing or the use of script, may be taught by similar procedure, the index-chart being in ordinary print, and the character-record containing the same subject matter in script. Obviously, also, shorthand writing may be taught with the same facility as longhand or ordinary script, and when familiarity with shorthand characters has been attained the sound-records may be employed for practice in taking of notes, as from oral dictation.

Elementary instruction in music reading may be effected, by the use of an index-chart and a character-record, on one of which is shown the usual symbolic music-notation, and upon the other the name or spoken designations, such as A-flat, D-sharp, etc. The sound-record used in connection with such an index-chart and character-record may be adapted to produce the sounds of the selected musical notes, as sung by the human voice, or as sounded by a musical instrument, such as a violin or piano. The representations of music need not be limited to single notes on each of the various portions of the charts and records, and a plurality of notes may be shown in each subdivision thereof, either in a sequence or in combination to form a chord.

By providing an index-chart showing single notes of a chromatic scale extending through several octaves, and a character-record with similar notation but with each note thereon represented being a definite number of semi-tones higher or lower in pitch than that of the corresponding portion of the index-chart, transposition of music from one key to another may be effected, the notes of the original composition being selected successively upon the index-chart, and the corresponding notes in the transposed-key composition being shown by the character-record.

Numerous other examples of the use of the selective reproducing mechanism might be cited, but it is believed that, to those skilled in the arts of teaching, such uses will be apparent from the examples already given.

Now, having described my invention, what I claim and desire to secure by Letters Patent is:

1. In combination, a character-record and an index-chart each having longitudinal and transverse rows of corresponding spaces respectively containing related subject matter, actuating means for moving the character-record longitudinally and transversely to dispose any of its several spaces at a reference position, and means for indicating upon the index-chart the space containing the subject matter related to that on the character-record at the reference position.

2. In combination, a type-member and an index-chart each having similar series of portions respectively containing related subject matter, means for actuating said type-member to dispose the several portions thereof selectively at a reference position, an indicating device movable relatively to said index-chart and controlled by said actuating means for the type-member, whereby to indicate upon said index-chart the subject matter relating to that portion of the type-member at the reference position, and means for actuating to a printing position the portion of the type-member at the reference position.

3. The combination of a sound-record, a character-record, and an index-chart each having a similar series of portions respectively containing related subject matter;

a sound-reproducer associated with said sound-record and movable selectively to operative relation with the several portions of said record, actuating means for selectively positioning said sound-reproducer, said actuating means being also connected with the character-record and adapted to selectively dispose the several portions thereof at a reference position, and said actuating means having an indicating portion adapted to designate upon the index-chart the portion thereof of which the related subject matter is selected upon the sound-record and character-record.

4. The combination with a sound-reproducer, of a sound-record having a plurality of groups of record-grooves inscribed with independent subject matter, an index-chart having a plurality of rows of spaces bearing matter indicative of the subject matter of the several groups of record-grooves, and a selector connected with the sound-reproducer and movable to register with the spaces of the index-chart, the connection between said selector and reproducer being adapted for actuating the latter relative to the sound-record and to thereby selectively dispose the reproducer in operative relation to the respective group of record-grooves of which the subject matter is indicated upon the chart-space registering with the selector.

5. The combination of a sound-record, a character-record, and an index-chart, each having a plurailty of portions and the corresponding portions of said records and chart containing related subject matter; a sound-reproducer operatively associated with said sound-record, a selector movable to register with the several portions of the index-chart, means connecting said selector and the character-record and actuating the latter to place at a reference position the portion thereof corresponding with that portion of the index-chart registering with the selector, and means connecting the selector with the sound-reproducer and actuating the latter to place the same in operative relation with the portion of the sound-record corresponding with the portion of the index-chart registering with the selector.

6. The combination with a sound-record and reproducer, of an index-chart divided into a plurality of unit areas, said unit areas bearing indicia corresponding with the subject matter of several definite portions of the sound-record, an indicator movable in proximity to said chart to register severally with the unit areas thereof, and means connecting said indicator with the sound-reproducer and adapted to actuate the latter coordinately with the indicator, whereby to position the reproducer in operative relation with that portion of the sound-record whose subject matter corresponds with the indicia of that unit area of the chart which registers with the indicator.

7. In a mechanism of the class described, a type-member lying normally in a uniform plane and having laterally and longitudinally extending rows of spaces each provided with characters, an index-chart having similar rows of spaces bearing indicia corresponding in subject matter with that of the characters on the respective spaces of the type-member, a selector connected with the type-member and having a portion movable into register with the several spaces of the index-chart, the type-member being actuated by said selector to place the respective spaces thereof in a reference position, and means for lifting the portions of the type-member at the reference position from the normal plane thereof.

8. In a mechanism of the class described, a flexible type-member, a support therefor having a plurality of laterally and longitudinally spaced openings, a member movable through said openings of the support to lift the respective portions of the type-member, means for moving said support laterally and longitudinally to severally dispose the openings in register with the lifting member, and indicating means for showing the subject matter of the portions of the type-member respectively registering with the lifting member.

9. The combination with a sound-record, actuating means therefor, and a sound-reproducer movable to traverse said record; of a chart divided into a plurality of unit areas, said unit areas bearing indicia relating to the subject matter of several portions of the sound-record, a selector movable in proximity to said chart to register severally with the unit areas thereof, means connecting said selector with the sound-reproducer and adapted to place the latter in operative relation to that portion of the sound-record of which the subject matter is indicated upon the unit area of the chart which is in register with the selector, means for operatively engaging the sound-reproducer with the record, and means for disengaging the reproducer and returning the same to a starting position after a pre-determined period of engagement with the record.

10. The combination with a sound-record, actuating means therefor, and a sound-reproducer arranged for coacting with said record; of an index-chart divided into a plurality of unit areas containing matter indicative of the subject matter of the several corresponding portions of the sound-record, a selector movable to register severally with the unit areas of said chart, means connecting said selector and sound-reproducer and adapted to selectively dispose the latter in operative relation to the portion of the sound-record of which the subject matter is indicated by the position of the selector relative to the index-chart, means for controlling the actuating means for the sound-record, means controlled by said actuating means for operatively engaging and disengaging the reproducer and record, and means associated with said controlling means for accurately positioning the selector prior to starting operation of the reproducing mechanism.

11. Means for teaching related modes of expression in characters and sounds, comprising an index-chart subdivided into a plurality of parts each containing subject matter expressed in a familiar mode, a character-record and a sound-record having parts corresponding to those of said index-chart and the several parts of said records respectively containing subject matter related to that of the corresponding part of the index-chart, a selector movable to register with the several parts of the index-chart, means controlled by said selector for disposing at a reference position that portion of the character-record on which the subject matter is related to that selected upon the index-chart, a sound-reproducer, and means controlled by the selector for disposing said reproducer in operative relation to that part of the sound-record on which the subject matter is related to that selected upon the index-chart.

12. The combination in mechanism of the class described, of a sound-record having a record-groove comprising a uniform series of alternating blank and inscribed portions, and an indexed member having a series of portions marked with indicia respectively relating to the subject matter of the several inscribed portions of the sound-record.

13. In combination, a character-record and an index-chart, each having its surface divided into corresponding spaces containing related subject matter, means for shifting the character-record bodily from one position to another to dispose any of its spaces at a reference position, and means for indicating upon the index-chart the spaces containing the subject matter relating to that on the character-record at the reference position.

14. In combination, a character-record and an index chart, each having successive rows of corresponding spaces containing related subject matter, means for shifting the character-record bodily from one position to another to dispose any of its spaces at a reference position, and means for indicating upon the index chart the spaces containing the subject matter relating to that of the character-record.

15. In combination, a character-record and an index chart, each having its rectangular area divided into successive rows of corresponding spaces containing related subject matter, means for shifting the character-record bodily from one position to another to dispose any of its spaces at a reference position, and means for indicating upon the index chart the space containing the subject matter relating to that on the character-record at the reference position.

16. In combination, a character-record and an index chart, each divided into successive rows of corresponding spaces having related subject matter, the character record being shiftable bodily from one position to another to dispose any of its spaces at a reference position, means for indicating upon the index chart the space containing the subject matter relating to that on the character-record at the reference position, and means for simultaneously actuating the character-record and the said indicating means.

17. In combination, a character-record and an index chart, each having successive rows of corresponding spaces containing related subject matter, means for shifting the character-record bodily from one position to another to dispose any of its spaces at a reference position, means for indicating upon the index chart the space containing the subject matter relating to that of the character-record at the reference position, and means for printing the subject matter of the space of the character record at the reference position and for exposing the printing simultaneously with the indicated space of the index chart.

18. The combination of a sound record and an index chart, each having a similar series of portions containing related subject matter, a sound reproducer associated with said sound record and movable selectively to operative position with the several portions of the sound record, an indicator movable over the index chart to designate thereon the portions thereof related to the selected portion of the sound record, and means for actuating the sound reproducer and the indicator.

19. The combination of a sound record and an index chart, each having a similar series of portions containing related subject matter, a sound reproducer associated with said sound record and movable selectively to operative position with the several portions of the sound record, an indicator movable over the index chart to designate thereon the portions thereof related to the selected portion of the sound record, and means for connecting the indicator with the sound reproducer and simultaneously actuating the same.

20. The combination of a sound-record and a character-record, each having a similar series of portions respectively containing related subject matter, a sound reproducer associated with said sound record and movable selectively to operative relation with the several portions of said record, and actuating means for selectively positioning said sound reproducer, said actuating means being also connected with the character record and actuating the same to shift the character record bodily to dispose the several portions thereof at a reference position.

21. The combination of a sound-record and a character-record, each having a similar series of portions respectively containing related subject matter, a sound reproducer associated with said sound record and movable selectively to operative relation with the several portions of said record, actuating means for selectively positioning said sound reproducer, said actuating means being also connected with the character record and actuating the same to shift the character record bodily to dispose the several portions thereof at a reference position, and means for printing the subject matter of the portion of the character record at the reference position.

22. The combination of a sound record, a character record, and an index chart, each having corresponding spaces respectively containing related subject matter, a sound reproducer associated with said sound record and movable selectively to operative relation with the several portions of said record, actuating means for selectively positioning said sound reproducer and for shifting the character-record bodily to dispose the several portions thereof at a reference position, said actuating means having an indicator movable over the index chart to designate thereon the portion thereof related to the selected subject matter of the sound-record and the character record, and means for printing the selected subject matter of the character-record and for exposing the same to view simultaneously with the indicated portion of the index chart.

23. In mechanism of the character described, a character-record and an index chart, each having successive rows of corresponding spaces containing related subject matter, and the character-record having its subject matter formed by printing members adapted for printing selected subject matter and exposing the same with the indicated portions on the index chart.

24. In mechanism of the class described, a sound record having record grooves comprising a uniform series of alternating blank and inscribed portions, an index chart having a series of portions marked with indicia respectively relating to the subject matter of the several inscribed portions of the sound record, and a character-record having a series of portions corresponding with the portions of the sound record and the index chart and containing relating subject matter.

25. In mechanism of the class described, a sound record having record grooves comprising a uniform series of alternating blank and inscribed portions, an index chart having a series of portions marked with indicia respectively relating to the subject matter of the several inscribed portions of the sound record, and a character-record having a series of portions corresponding with the portions of the sound record and the index chart and containing related subject matter.

26. In combination, a character-record and an index chart, each having corresponding spaces respectively containing related subject matter, means for selectively presenting the spaces of the character record at a reference position and for simultaneously indicating on the index chart the selected subject matter, and means for printing the selected subject matter of the character-record including an auxiliary member having a tape on which the said selected subject matter is printed, the said member being movable to and from a position for exposing said tape.

ARTHUR L. RUNYAN.